United States Patent
Arndt et al.

(10) Patent No.: US 7,308,557 B2
(45) Date of Patent: Dec. 11, 2007

(54) METHOD AND APPARATUS FOR INVALIDATING ENTRIES WITHIN A TRANSLATION CONTROL ENTRY (TCE) CACHE

(75) Inventors: Richard L. Arndt, Austin, TX (US); George W. Daly, Jr., Austin, TX (US); James S. Fields, Jr., Austin, TX (US); Warren E. Maule, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 11/054,182

(22) Filed: Feb. 9, 2005

(65) Prior Publication Data

US 2006/0190685 A1    Aug. 24, 2006

(51) Int. Cl.
*G06F 9/26* (2006.01)
*G06F 9/34* (2006.01)
*G06F 12/00* (2006.01)

(52) U.S. Cl. .................. 711/220; 710/308
(58) Field of Classification Search ........... 710/308; 711/220

See application file for complete search history.

(56) References Cited

U.S. PATENT DOCUMENTS 6,701,417 B2 * 3/2004 Chaudhry et al. .......... 711/141
2006/0075147 A1 * 4/2006 Schoinas et al. ............ 710/3

* cited by examiner

*Primary Examiner*—Matthew Kim
*Assistant Examiner*—Edward J Dudek
(74) *Attorney, Agent, or Firm*—Diana R. Gerhardt; Dillon & Yudell LLP

(57) ABSTRACT

A method and apparatus for invalidating entries within a translation control entry (TCE) cache are disclosed. A host bridge is coupled between a group of processors and a group of adaptors. The host bridge includes a TCE cache. The TCE cache contains the most-recently use copies of TCEs in a TCE table located in a system memory. In response to a modification to a TCE in the TCE table by one of the processors, a memory mapped input/output (MMIO) Store is sent to a TCE invalidate register to specify an address of the modified TCE. The data within the TCE invalidate register is then utilized to generate a command for invalidating an entry in the TCE cache containing an unmodified copy of the modified TCE in the TCE table. The command is subsequently sent to the host bridge to invalidate the entry in the TCE cache.

20 Claims, 3 Drawing Sheets

METHOD AND APPARATUS FOR INVALIDATING ENTRIES WITHIN A TRANSLATION CONTROL ENTRY (TCE) CACHE

BACKGROUND OF THE INVENTION

1. Technical Field

The present invention relates to host bridges in general, and, in particular, to a translation control entry (TCE) cache within a Peripheral Component Interconnect (PCI) host bridge. Still more particularly, the present invention relates to a method and apparatus for invalidating entries within a TCE cache within a PCI host bridge.

2. Description of Related Art

Generally speaking, a Peripheral Component Interconnect (PCI) host bridge provides communications between a processor and an input/output (I/O) subsystem within a data processing system. The PCI host bridge provides data buffering capabilities to allow read and write data to be transferred between the processor and the I/O subsystem. The I/O subsystem can be a group of PCI devices connected to a PCI bus. When a PCI device on the PCI bus originates a read or write command to a system memory via a direct memory access (DMA), the PCI host bridge translates a PCI address of the DMA to a system memory address of the system memory.

Each PCI device on the PCI bus is associated with a corresponding translation control entry (TCE) table resided within the system memory. The TCE tables can be utilized to preform TCE translations from PCI addresses to system memory addresses. In response to a DMA read or write operation, a corresponding TCE table is read by the PCI host bridge to provide a TCE translation.

Typically, a copy of each TCE that the PCI host bridge has fetched from a TCE table is held by the PCI host bridge in a TCE cache. The PCI host bridge may subsequently reuse any of the TCEs in its TCE cache to determine the system memory location to which a DMA read or write operation will be directed.

When a TCE within a TCE table has been modified by a processor, the PCI host bridge has to remove its own copy of the same TCE from its TCE cache. Since the PCI host bridge is not directly connected to the system bus to which the processor is connected, the PCI host bridge is generally unaware of any modification to the TCE table made by the processor. As such, special hardware connected to the system bus is utilized to detect processor Stores to the TCE table. In response to a detection of a processor Store to the TCE table, the special hardware then sends a DKill command to the PCI host bridge to invalidate the copy of the TCE that has been modified by the processor.

If the special hardware sends a DKill command to the PCI host bridge every time when there is a processor Store to the TCE table, excessive traffic can be generated between the special hardware and PCI host bridge. But more importantly, most of the efforts will be wasted because the PCI host bridge's TCE cache probably does not even have copies of most of the TCEs that are modified by the processor. On the other hand, if the special hardware is to make aware of all the copies of the TCEs stored in the TCE cache by having a TCE directory included within the special hardware, the special hardware would become too complex to be efficient. Consequently, it would be desirable to provide an improved apparatus for invalidating TCEs in a TCE cache within a PCI host bridge.

SUMMARY OF THE INVENTION

In accordance with a preferred embodiment of the present invention, a host bridge is coupled between a group of processors and a group of adaptors. The host bridge includes a translation control entry (TCE) cache. The TCE cache contains the most-recently use copies of TCEs in a TCE table located in a system memory. In response to a modification to a TCE in the TCE table by one of the processors, a memory mapped input/output (MMIO) Store is sent to a TCE invalidate register to specify an address of the modified TCE. The data within the TCE invalidate register is then utilized to generate a command for invalidating an entry in the TCE cache containing an unmodified copy of the modified TCE in the TCE table. The command is subsequently sent to the host bridge to invalidate the entry in the TCE cache.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
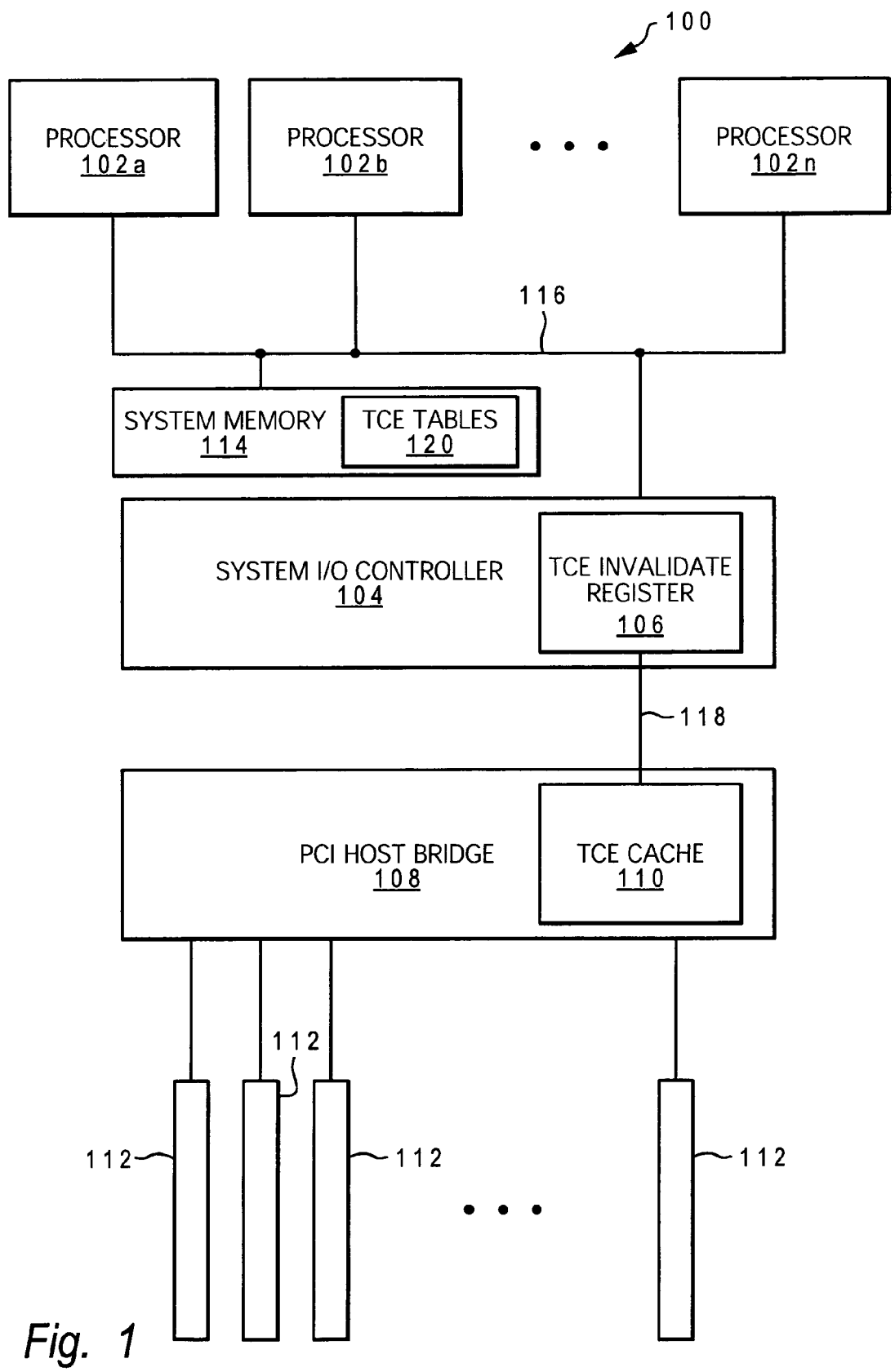
FIG. 1 is a block diagram of a multiprocessor system in which a preferred embodiment of the present invention can be implemented.

Referring now to the drawings and in particular to FIG. 1, there is depicted a block diagram of a multiprocessor system in which a preferred embodiment of the present invention may be implemented. As shown, a multiprocessor system 100 includes processors 102a-102n coupled to a system memory 114 via an interconnect 116. Multi-processor system 100 also includes adaptors 112 coupled to interconnect 116 via a host bridge 108 and a system input/output (I/O) controller 104. For the present embodiment, host bridge 108 and adaptors 112 are Peripheral Component Interconnect (PCI) host bridge and PCI adaptors, respectively. Hence, host bridge 108 and adaptors 112 can support a variety of I/O devices that are conformed to the PCI standard. Details of the PCI standard can be found in *PCI Local Bus Specification*, Revision 2.2, dated Dec. 18, 1998.

PCI host bridge 108 provides an address translation function between the PCI address space and system memory address space, which is commonly referred to as a translation control entry (TCE) translation. System memory 114 includes multiple TCE tables 120, and each of TCE tables 120 is associated with one of PCI adaptors 112 connected to PCI host bridge 108. A TCE address register (not shown) is provided within PCI host bridge 108 to be served as a pointer to one of corresponding TCE tables 120 for the purpose of TCE translations. TCEs within each one of TCE tables 120 can be looked up and fetched by PCI host bridge 108. Also, a copy of the fetched TCE can be kept in a TCE cache 110 for subsequent usage. Because TCE cache 110 has a lower latency than system memory 114, locally cached copies of TCEs can improve system performance.

TCE cache 110 can be used by either DMA reads or DMA writes. Each TCE in TCE cache 110 is associated with a respective DMA read or DMA write operation. Such organization results in more efficient utilization of the limited resources available for caching TCEs. The number of TCEs within TCE cache 110 allocated to DMA reads or DMA writes is based on dynamic usage.

PCI host bridge 108 is coupled to system I/O controller 104 via a mezzanine bus 118 to provide communications between PCI host bridge 108 and system I/O controller 104. Included within system I/O controller 104 is a TCE invalidate register 106.

Figure 2:
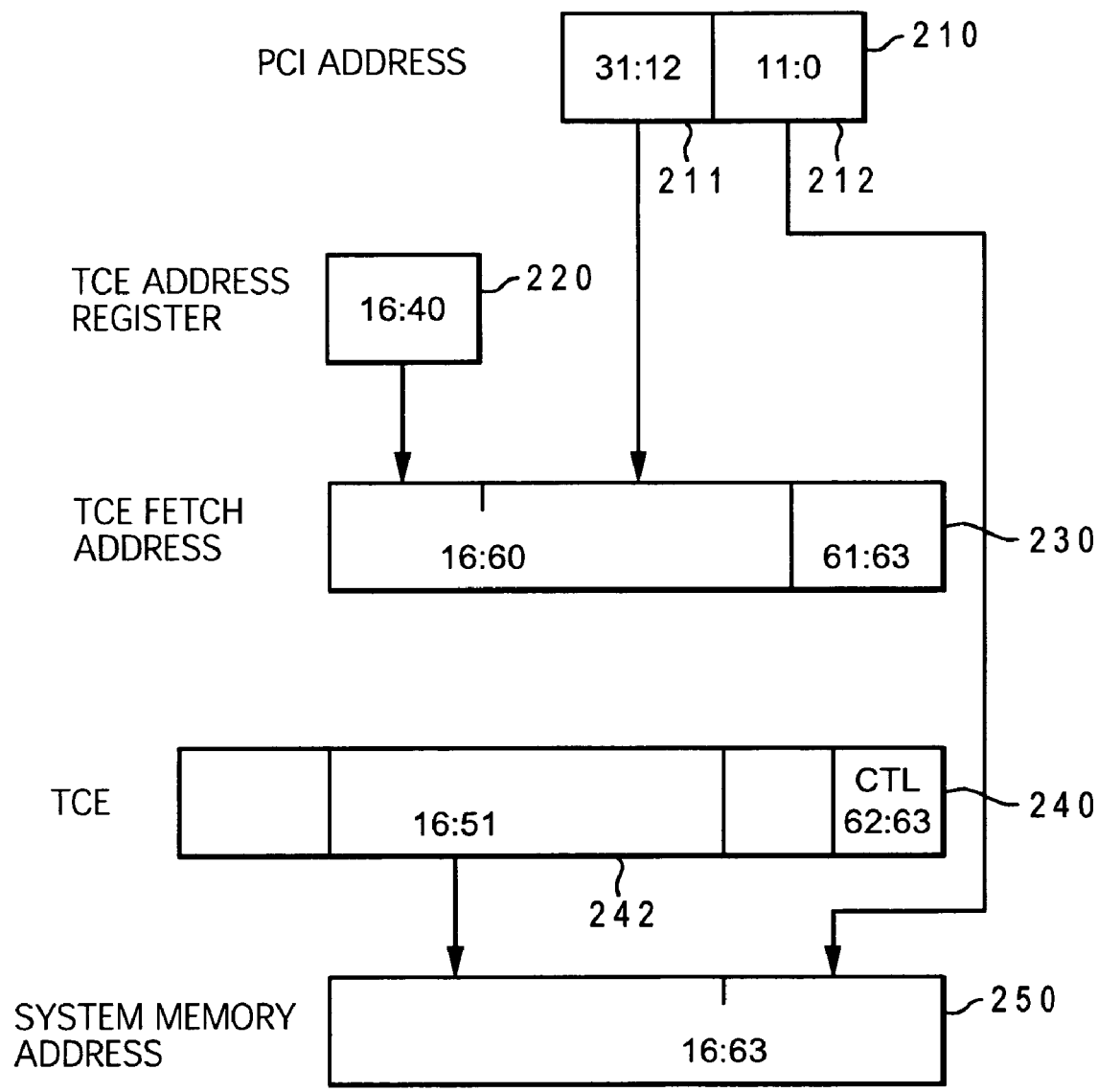
FIG. 2 graphically depicts a translation control entry (TCE) translation, in accordance with a preferred embodiment of the present invention.

With reference now to FIG. 2, there is graphically illustrated a TCE translation process in accordance with a preferred embodiment of the present invention. A TCE fetch address 230 is initially formed by appending high-order bits 211 of a PCI address 210 to a TCE address in a TCE address register 220. With TCE fetch address 230, a TCE 240 can be obtained from a TCE table (such as one of TCE tables 120 from FIG. 1). A system memory address 250 is then formed by combining address bits 242 of TCE 240 and low-order bits 212 of PCI address 210.

In accordance with a preferred embodiment of the present invention, a memory mapped input/output (MMIO) Store is sent to TCE invalidate register 106 (from FIG. 1) to specify the address of a TCE that has been modified by one of processors 102a-102n. In turn, system I/O controller 104 utilizes the data from the MMIO Store to generate an address for a DKill operation that is to be sent to PCI host bridge 108 via mezzanine bus 118. The copy of the modified TCE stored within TCE cache 110 is subsequently invalidated by the DKill operation.

Each cache line (or entry) within TCE cache 110 preferably contains multiple TCEs. For the present embodiment, each cache line within TCE cache 110 is 128 bytes long and contains 16 TCEs. When there are multiple TCEs that needed to be invalidated on a cache line, information from some or all of the MMIO Stores can be combined to generate a single address of one DKill operation for invalidating all the multiple TCEs on the same cache line within TCE cache 110. As a result, the traffic between system I/O controller 104 and PCI host bridge 108 can be reduced.

Figure 3:
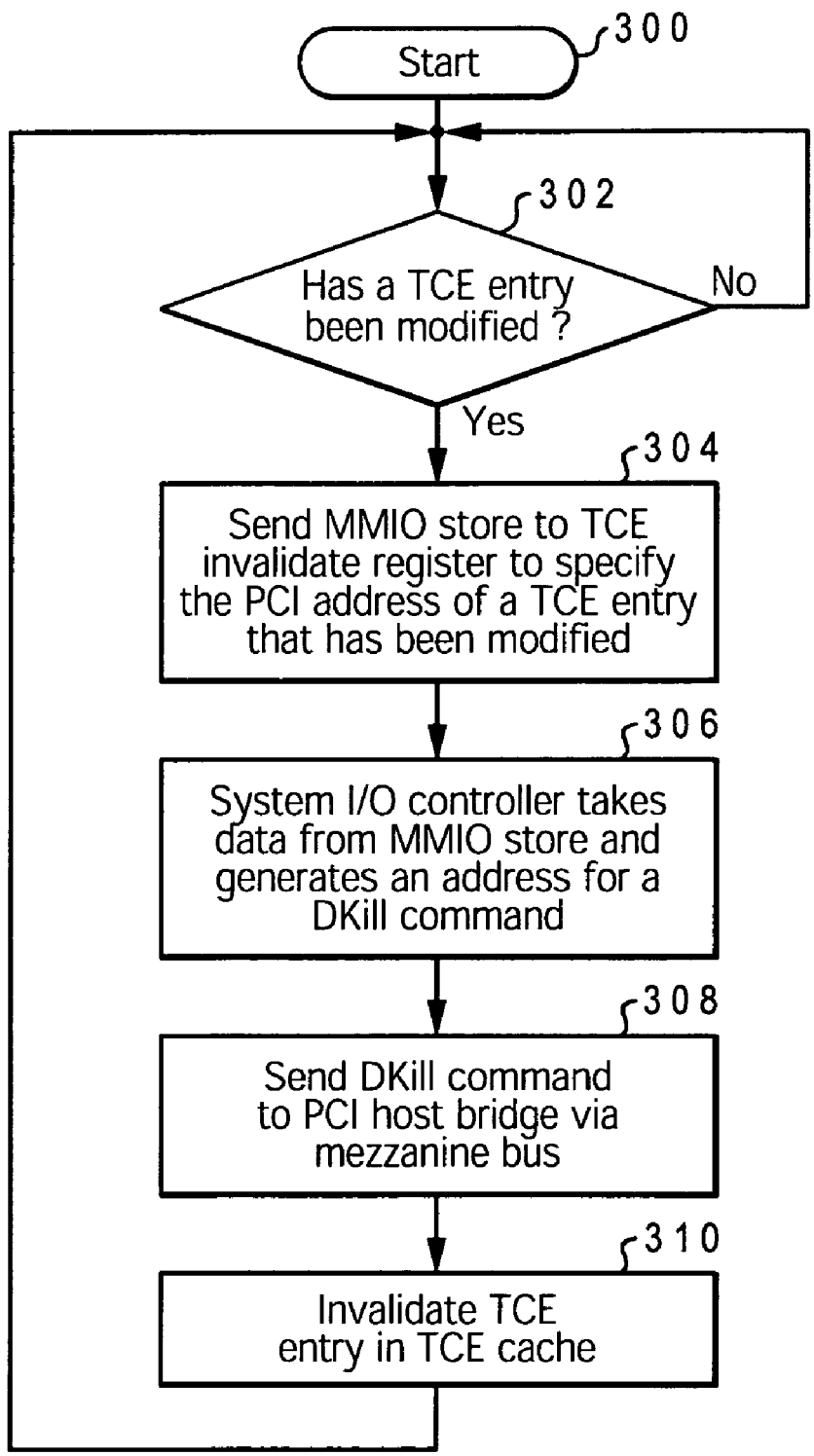
FIG. 3 is a high-level logic flow diagram of a method for invalidating entries within a TCE cache within a host bridge, in accordance with a preferred embodiment of the present invention.

Referring now to FIG. 3, there is illustrated a high-level logic flow diagram of a method for invalidating entries within a TCE cache within a host bridge, in accordance with a preferred embodiment of the present invention. Starting at block 300, a determination is made as to whether or not a TCE in a TCE table, such as one of TCE tables 120 from FIG. 1, has been modified, as shown in block 302. If a TCE in the TCE table has been modified, a MMIO store is sent by the firmware of a data processing system to a TCE invalidate register, such as TCE invalidate register 106 from FIG. 1, to specify the particular address of the modified TCE, as depicted in block 304.

Next, a system I/O controller, such as I/O controller 104 from FIG. 1, in which the TCE invalidate register resides, uses the data from the MMIO Store to generate an address for a DKill operation, as depicted in block 306. The generated DKill operation is then sent to a PCI host bridge, such as PCI host bridge 108 in FIG. 1, by the system I/O controller over a mezzanine bus, as shown in block 308. The TCE entry in a TCE cache within the PCI host bridge that corresponds to the address in the DKill operation is subsequently invalidated, as depicted by block 310.

As has been described, the present invention provides a method and apparatus for invalidating entries within a TCE cache within a PCI host bridge. The present invention requires minimal hardware and complexity in a system I/O controller. Since the timing of invalidating an entry within the TCE cache can be controlled, the bandwidth on a mezzanine bus between the system I/O controller and the PCI host bridge can be optimized.

As an alternative embodiment, the TCE invalidate register can be mapped into the address space of the system memory so that the TCE invalidate register can be implemented within the PCI host bridge instead of the system I/O controller.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for invalidating entries within a translation control entry (TCE) cache within a host bridge, wherein said host bridge is coupled between a plurality of processors and a plurality of adaptors, said method comprising:

detecting a modification to a TCE in a TCE table located within a system memory, wherein said TCE is identified within said TCE table via a TCE fetch address formed by combining high-order bits of a Peripheral Component Interconnect (PCI) address with a TCE address within a TCE address register, wherein a system memory address for a PCI device associated with said TCE is formed by combining a subset of address bits from said TCE with low-order bits of said PCI address;

in response to a detection of a modified TCE in said TCE table, sending a memory mapped input/output (MMIO) Store to a TCE invalidate register to specify an address of said modified TCE;

utilizing data within said TCE invalidate register to generate a command for invalidating an entry in said TCE cache containing an unmodified copy of said modified TCE in said TCE table; and invalidating said entry in said TCE cache.

2. The method of claim 1, wherein said modification to said TCE in said TCE table is performed by one of said plurality of processors.

3. The method of claim 1, wherein said TCE invalidate register is located within a system input/output (I/O) controller.

4. The method of claim 1, wherein said TCE invalidate register is located within a system memory.

5. The method of claim 1, wherein said utilizing further includes utilizing data within said TCE invalidate register to generate an address for a DKill operation for invalidating said entry in said TCE cache.

6. The method of claim 1, wherein said utilizing further includes combining information from a plurality of MMIO Stores to generate a command for invalidating multiple TCEs within said entry in said TCE cache.

7. The method of claim 6, wherein said command for invalidating multiple TCEs is a DKill operation.

8. An apparatus for invalidating entries within a translation control entry (TCE) cache within a host bridge, wherein said host bridge is coupled between a plurality of processors and a plurality of adaptors, said apparatus comprising:

means for detecting a modification to a TCE in a TCE table located within a system memory, wherein said TCE is identified within said TCE table via a TCE fetch address formed by combining high-order bits of a Peripheral Component Interconnect (PCI) address with a TCE address within a TCE address register, wherein a system memory address for a PCI device associated with said TCE is formed by combining a subset of address bits from said TCE with low-order bits of said PCI address;

in response to a detection of a modified TCE in a TCE table, means for sending a memory mapped input/output (MMIO) Store to a TCE invalidate register to specify an address of said modified TCE;

means for utilizing data within said TCE invalidate register to generate a command for invalidating an entry in said TCE cache containing an unmodified copy of said modified TCE in said TCE table; and means for invalidating said entry in said TCE cache.

9. The apparatus of claim 8, wherein said modification to said TCE in said TCE table is performed by one of said plurality of processors.

10. The apparatus of claim 8, wherein said TCE invalidate register is located within a system input/output (I/O) controller.

11. The apparatus of claim 8, wherein said TCE invalidate register is located within a system memory.

12. The apparatus of claim 8, wherein said means for utilizing further includes means for utilizing data within said TCE invalidate register to generate an address for a DKill operation for invalidating said entry in said TCE cache.

13. The apparatus of claim 8, wherein said means for utilizing further includes means for combining information from a plurality of MMIO Stores to generate a command for invalidating multiple TCEs within said entry in said TCE cache.

14. The apparatus of claim 13, wherein said command for invalidating multiple TCEs is a DKill operation.

15. An apparatus for invalidating entries within a translation control entry (TCE) cache within a host bridge, wherein said host bridge is coupled between a plurality of processors and a plurality of adaptors, said apparatus comprising:

a processor for sending a memory mapped input/output (MMIO) Store to a TCE invalidate register, in response to a detection of a modified TCE in said a TCE table, to specify an address of said modified TCE, wherein said TCE table is located within a system memory, wherein said modified TCE is identified within said TCE table via a TCE fetch address formed by combining high-order bits of a Peripheral Component Interconnect (PCI) address with a TCE address within a TCE address register, wherein a system memory address for a PCI device associated with said modified TCE is formed by combining a subset of address bits from said modified TCE with low-order bits of said PCI address;

a system input/output (I/O) controller for utilizing data within said TCE invalidate register to generate a command for invalidating an entry in said TCE cache containing an unmodified copy of said modified TCE in said TCE table; and a PCI host bridge for invalidating said entry in said TCE cache.

16. The apparatus of claim 15, wherein said TCE invalidate register is located within said system I/O controller.

17. The apparatus of claim 15, wherein said TCE invalidate register is located within a system memory.

18. The apparatus of claim 15, wherein said system I/O controller for utilizing further includes means for utilizing data within said TCE invalidate register to generate an address for a DKill operation for invalidating said entry in said TCE cache.

19. The apparatus of claim 15, wherein said system I/O controller for utilizing further includes means for combining information from a plurality of MMIO Stores to generate a command for invalidating multiple TCEs within said entry in said TCE cache.

20. The apparatus of claim 19, wherein said command for invalidating multiple TCEs is a DKill operation.

* * * * *